(12) United States Patent
O'Keefe

(10) Patent No.: US 11,783,348 B2
(45) Date of Patent: Oct. 10, 2023

(54) SYSTEM INCENTIVIZING GREEN ENERGY USAGE

(71) Applicant: Frank T. O'Keefe, Lloyd Harbor, NY (US)

(72) Inventor: Frank T. O'Keefe, Lloyd Harbor, NY (US)

( * ) Notice: Subject to any disclaimer, the term of this patent is extended or adjusted under 35 U.S.C. 154(b) by 0 days.

(21) Appl. No.: 17/653,496

(22) Filed: Mar. 4, 2022

(65) Prior Publication Data
US 2022/0281344 A1    Sep. 8, 2022

Related U.S. Application Data

(60) Provisional application No. 63/156,744, filed on Mar. 4, 2021.

(51) Int. Cl.
| | | |
|---|---|---|
| *G06Q 30/00* | (2023.01) | |
| *G06Q 30/018* | (2023.01) | |
| *G06Q 30/0207* | (2023.01) | |
| *B60L 53/66* | (2019.01) | |

(52) U.S. Cl.
CPC ........ *G06Q 30/018* (2013.01); *B60L 53/665* (2019.02); *G06Q 30/0222* (2013.01); *G06Q 30/0224* (2013.01); *Y02P 90/90* (2015.11)

(58) Field of Classification Search
CPC ............. G06Q 30/018; G06Q 30/0222; G06Q 30/0224; B60L 53/665; Y02P 90/90; Y02P 90/84; Y02T 10/70; Y02T 10/7072; Y02T 90/12; Y02T 90/16; Y04S 30/14
See application file for complete search history.

(56) References Cited

U.S. PATENT DOCUMENTS

| | | |
|---|---|---|
| 8,836,281 B2 | 9/2014 | Ambrosio et al. |
| 8,930,236 B2 | 1/2015 | Gillenson et al. |
| 10,173,544 B2 | 1/2019 | Hendrix et al. |

(Continued)

FOREIGN PATENT DOCUMENTS

| | | |
|---|---|---|
| BR | 102014020133 A2 | 7/2016 |
| CN | 104850742 A | 8/2015 |
| WO | 2020110329 A1 | 6/2020 |

OTHER PUBLICATIONS

PCT International Search Report & Written Opinion of the International Searching Authority; Application No. PCT/US22/70962;Completed: May 10, 2022; dated May 23, 2022; 9 Pages.

(Continued)

*Primary Examiner* — Meredith A Long
(74) *Attorney, Agent, or Firm* — WHITMYER IP GROUP LLC

(57) ABSTRACT

A system incentivizing green energy usage is provided having a charging station, an electricity source electrically connected to said charging station, a signal indicative of the sustainability of the electricity source received by said charging station, a mobile electric device receiving electrical charge from said charging station, a signal indicative of electrical charge drawn from the electrical charging station, a signal indicative of usage data for the mobile electric device, the charging station determining pricing based on at least one of the signal indicative of the sustainability of the electricity source, the signal indicative of the electrical charge drawn and the signal indicative of usage data.

19 Claims, 1 Drawing Sheet

(56) References Cited

U.S. PATENT DOCUMENTS

| | | |
|---|---|---|
| 2010/0063902 A1 | 3/2010 | Constantz et al. |
| 2012/0191524 A1* | 7/2012 | Ambrosio ............... B60L 53/64 |
| | | 705/14.23 |
| 2018/0229617 A1* | 8/2018 | Hendrix ................ B60L 53/305 |
| 2018/0261861 A1 | 9/2018 | Jamal et al. |
| 2019/0058328 A1 | 2/2019 | Khan |
| 2020/0380477 A1* | 12/2020 | Dunjic .................. B60L 53/305 |
| 2022/0036020 A1* | 2/2022 | Kovarik ............. G06K 7/10376 |

OTHER PUBLICATIONS

Wojick. "Carbon Storage in Soil The Ultimate No-Regrets Policy?"; a report to Greening Earth Society; Nov. 1, 1999; 17 pages.

Rodgers, et al. "US tax credit encourages investment in carbon capture and storage"; White&Case LLp; Jan. 29, 2021; 10 pages.

PCT International Search Report & Written Opinion of the International Searching Authority or the Declaration; Application No. PCT/US22/70962; Completed: May 18; dated Jun. 24, 2022; 18 Pages.

Peters. "This 'personal carbon sequestration' device uses algae to capture CO2"; Web. Retrieved Online [May 17, 2022]. <URL:https://www.fastcompany.com/90404556/this-personal-carbon-sequestration-device-uses-algae-to-capture-co2>; Sep. 17, 2019; 14 pages.

\* cited by examiner

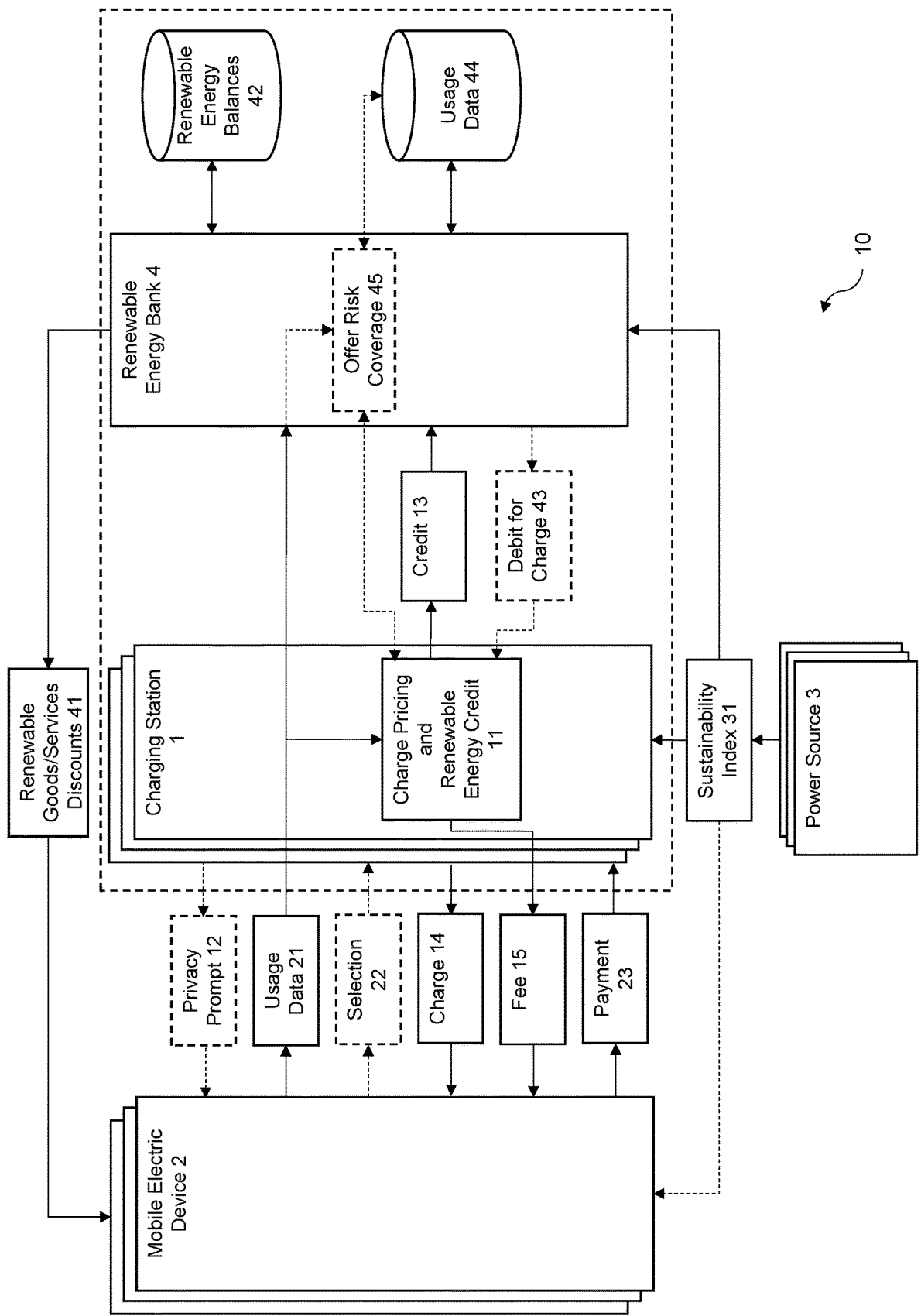

SYSTEM INCENTIVIZING GREEN ENERGY USAGE

CROSS-REFERENCE TO RELATED APPLICATIONS

This disclosure claims the benefit, under 35 U.S.C. § 119(e), of U.S. Provisional Patent Application No. 63/156,744, filed Mar. 4, 2021, the contents of which are incorporated herein by reference in their entirety.

TECHNICAL FIELD

The present invention relates to a novel system incentivizing green energy usage. Specifically, the system is used to provide discounts to those who choose to use green or sustainable energy.

BACKGROUND

Without the wide-spread adoption of electric vehicles, carbon levels will continue to rise unabated, harming our planet. Carbon emissions must be cut, and electricity generation must be renewable.

Electric vehicle ownership will soon rise. At only two percent of the market for vehicles today, public policy supports the transition to electric vehicles. What is needed is a system that helps lower the cost of ownership of an electric vehicle to accelerate adoption.

Though federal incentives exist for electric vehicle adoption, there are still numerous downsides to electric vehicles. Electric vehicles remain expensive, cost more to insure, and drivers fear being stranded without a charging station or having to replace a battery. However, auto manufacturers are transitioning to electric vehicles at a great pace.

One way this could be accomplished is by abandoning the fixed-largely fixed-cost methods for pricing vehicle-related goods and services such as propellant (gasoline, electric charge) and insurance. Driver specific protocols, that consider usage data and sustainability, can be used to provide driver-specific protocols that incentivize green energy and sustainability.

In such a system, though a user will be providing data about their vehicle use with permission, the information may be constrained, and need not include intimate information such as financial information, health, location, browser history, and app usage history.

A rewards system may be put in place to incentive green energy usage. Such rewards may be used by a member to buy electric vehicles, charging, solar panels, electric vehicle insurance, carbon credits and offsets, or shares in carbon credit funds and other select sustainable products.

SUMMARY

For these and other reasons known to a person of an ordinary skill in the art, what is needed is a system incentivizing green energy usage.

A goal of the present invention is to promote the adoption of electric vehicles.

Another goal of the present invention is to provide a lower cost of entry for sustainable and environmentally-sound practices.

In one aspect of the present invention, a system incentivizing green energy usage is disclosed as having a having a charging station and an electricity source electrically connected to said charging station. A signal indicative of the sustainability of the electricity source is received by said charging station. A mobile electric device receives electrical charge from said charging station. The system generates a signal indicative of electrical charge drawn from the electrical charging station and a signal indicative of usage data for the mobile electric device. The charging station determines pricing based on at least one of the signal indicative of the sustainability of the electricity source, the signal indicative of the electrical charge drawn and the signal indicative of usage data.

In another aspect of the present invention, a system incentivizing green energy usage is disclosed as having a having a charging station and an electricity source electrically connected to said charging station. A signal indicative of the sustainability of the electricity source is received by said charging station. A mobile electric device receiving electric charge from said charging station. A signal indicative of electrical charge drawn from the electrical charging station. A signal indicative of usage data for the mobile electric device. The charging station determining a renewable energy credit based on at least one of the signal indicative of the sustainability of the electricity source, the signal indicative of the electrical charge drawn and the signal indicative of usage data. A renewable energy bank in data communication with said charging station. A signal indicative of the renewable energy credit received by the renewable energy bank. The renewable energy bank applies the credit to a ledger of renewable energy balances. A renewable goods or services discount is received by said mobile electric device based on the renewable energy balance associated with said mobile electric device.

BRIEF DESCRIPTION OF THE DRAWINGS

FIG. 1 shows a schematic diagram of the presently disclosed system.

DETAILED DESCRIPTION

The present invention will now be described by referencing the appended figures.

Referring to FIG. 1, the present disclosure describes a system 10 for incentivizing green energy usage.

The system 10 may include a charging station 1, a mobile electric device 2, a power source 3, and a renewable energy bank 4.

The charging station 1 may be an electrical charging station, such as one for electric vehicles. Alternatively, the charging station 1 may be used to charge electronic devices such as a laptop, smartphone, tablet, or other electronic device capable of receiving electricity. The charging station 1 may also provide other renewable energy sources such as hydrogen. The charging station 1 may include a processor, computer, remote computer, computer server, network, or any other computing resource.

A mobile electric device 2 may in data and/or electrical communication with the charging station 1. The mobile electric device 2 may be any device that requires energy or charging. The mobile electric device 2 may be a vehicle, computer, laptop, smartphone, tablet, or other electronic device capable of receiving electricity and transmitting data to the computer 1. The mobile electric device 2 may include a processor, computer, remote computer, computer server, network, or any other computing resource. The mobile electric device 2 may be split, in that the part that receives a charge need not be the part that communicates with other portions of the system 10. For instance, a car receiving a charge may communicate with the system 10 via a smartphone.

A power source 3 may in data and/or electrical communication with the charging station 1. The power source 3 may be any device that provides energy to the charging station 1. For example, the power source 3 may be a solar panel on a person's home. Alternatively or in addition, the power source 3 may provide energy to the electrical grid. The mobile electric power source 3 may include a processor, computer, remote computer, computer server, network, or any other computing resource.

A renewable energy bank 4 may be in communication with the charging station 1, mobile electric device 2, and/or power source 3. The renewable energy bank 4 may include a processor, computer, remote computer, computer server, network, or any other computing resource.

The mobile electric device 2 may provide usage data 21 to at least one of the charging stations 1 and the renewable energy bank 4. The usage data may be stored in a usage data database 44. The usage data 2 may include information about the mobile electric device 2. For example, in the case of the mobile electric device 2 being an electric vehicle, the usage data 2 may include information about the number of miles driven, the energy used, location information about where the vehicle was driven and when, driving practices, and more. As another example, if a user has solar panels at home, the mobile electric device 2 may provide information about the solar panels and the energy generated thereby as part of the usage data 21. As another example, usage data 21 may include information regarding advertisements watched by the user of the mobile electric device or of activity on a social networking website.

In some embodiments, the mobile electric device 2 may receive a privacy prompt 12 before any usage data 21 is provided. The privacy prompt 12 may ask the user to agree to disclose usage data 21. Unless the user agrees to the disclosure, no usage data 21 will be provided to the system. The user's agreeance may be limited to certain types of usage data, certain timeframes, or other known limitations.

The charging station 1 may allow a user to select from various power sources 3 that may be used to charge the mobile electric device. Each power source 3 may provide a sustainability index 31 to the power source 3. Higher sustainability indices 31 may indicate that the power source is generating energy is a cleaner way, e.g., in a hydroelectric plant instead of a coal power plant. The user of the mobile electric device 2 may select 22 a power source 3 after being presented with the sustainability indices 31 and/or the fee 15 for that power source 3 (e.g., on a per unit basis). Alternatively, the mobile electric device 2 may be preset to always select the greenest option.

The charging station 1 may provide charge 14 to the mobile electric device 2 from the selected power source 3. A fee 15 may be assessed for the charge 14 provided. Fees 15 for charge 14 from different power sources 3 may be different. The fee 15 may be reduced based on the usage data 21, if the user chose to provide it. Payment 23 may be collected via a stored or tendered payment method associated with the mobile electric device 2.

Based on the usage data 21 (if provided) and the sustainability index 31 associated with the power source 3, the charging station 1 may determine a credit 13. The credit 13 may be transmitted to the renewable energy bank 4.

The renewable energy bank 4 may associate the credit 13 with a renewable energy balance 42 associated with the mobile electric device 2. The renewable energy bank 4 may apply the credit 13 to the renewable energy balance 42.

Based on the renewable energy balance 42, the renewable energy bank may provide a renewable goods/services discount 41 to the mobile electric device 2. The mobile electric device 2 may use the renewable goods/services discount 41 to buy or discount goods/services. For example, the mobile electric device 2 may use the discounts 41 as a debit 43 for the fee generated by the charge 13. Alternatively, the renewable goods/services discount 41 may be used to buy insurance, solar panels, carbon credits/offsets, or other environmentally friendly products/services.

In some embodiments, risk coverage 45 may be provided at the charging station 1 based on the usage data 21 and/or the charge 13. While risk coverage may be provided by renewable energy bank 4, it should be understood that any third-party system may be used to assess and provide risk coverage. Usage data 21 regarding the mobile electric device 2 may be required to provide risk coverage. In some cases, usage data 44 stored in the usage data database 44 may also be used to offer risk coverage. The risk coverage 45 may be paid for as part of the fee 13. The credit 13 or renewable goods/services discount 41 may be used to pay for at least part of the risk coverage 45.

The charge drawn by the mobile electric device 2 may also be used to determine risk coverage, as it provides an indicator of the extent of future use, including if the mobile electric device 2 is an electric vehicle. In this way, the payment includes only coverage which is required.

In some embodiments, the charging station 1 and the renewable energy bank 4 may be provided by a single source, either as a single computer or network of computers.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention, and is not intended to limit the invention to a specific embodiment illustrated by the figures above or description below.

For purposes of explanation and not limitation, specific details are set forth such as particular architectures, interfaces, techniques, etc. to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention", unless context clearly indicates otherwise.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one, more, or all of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the invention and the claims.

What is claimed is:

1. A system incentivizing green energy usage, comprising:
a charging station;
an electricity source electrically connected to said charging station;
a signal indicative of the sustainability of the electricity source received by said charging station;
a mobile electric device receiving electrical charge from said charging station;
a signal indicative of electrical charge drawn from the electrical charging station;
a signal indicative of usage data for the mobile electric device;
the charging station determining pricing based on at least two of the signal indicative of the sustainability of the electricity source, the signal indicative of the electrical charge drawn and the signal indicative of usage data;
the charging station determining a renewable energy credit based on at least one of the signal indicative of the sustainability of the electricity source, the signal indicative of the electrical charge drawn and the signal indicative of usage data;
a renewable energy bank in data communication with said charging station,
a signal indicative of the renewable energy credit received by the renewable energy bank,
the renewable energy bank applying the credit to a ledger of renewable energy balances.

2. The system of claim 1, further comprising:
a renewable goods or services discount received by said mobile electric device based on the renewable energy balance associated with said mobile electric device.

3. The system of claim 2, wherein the renewable goods or services discount may be used to purchase at least one of electric vehicles, charging, solar panels, electric vehicle insurance, carbon credits and offsets, or shares in carbon credit funds.

4. The system of claim 2, wherein the credit is applied as a debit to the pricing.

5. The system of claim 1, further comprising:
the signal indicative of usage data received by the renewable energy bank, the renewable energy bank storing the signal indicative of usage data in a database.

6. The system of claim 1, wherein the charging station and the renewable energy bank are operated by the same entity.

7. The system of claim 1, wherein the mobile electric device includes an electric vehicle.

8. The system of claim 7, wherein the usage data includes information about the number of miles driven by the electric vehicle, the energy used by the electric vehicle, location information about where the electric vehicle was driven and when, and driving practices.

9. The system of claim 8, further comprising:
the mobile electric device receiving a prompt for usage data;
the mobile electric device selectively limiting the usage data provided to the system based on user preference.

10. The system of claim 7, wherein the usage data is used to determine an insurance coverage rate for electric vehicle.

11. The system of claim 10, wherein the insurance coverage associated with the insurance coverage rate is applicable only to miles driven with the charge.

12. The system of claim 10, wherein the insurance coverage rate is paid as part of the pricing.

13. The system of claim 1, wherein the mobile electric device selects a power source based at least on a sustainability index.

14. The system of claim 1, further comprising the charging station receiving payment based on the pricing.

15. A system incentivizing green energy usage, comprising:
a charging station;
an electricity source electrically connected to said charging station;
a signal indicative of the sustainability of the electricity source received by said charging station;
a mobile electric device receiving electric charge from said charging station;
a signal indicative of electrical charge drawn from the electrical charging station;
a signal indicative of usage data for the mobile electric device;
the charging station determining a renewable energy credit based on at least two of the signal indicative of the sustainability of the electricity source, the signal indicative of the electrical charge drawn and the signal indicative of usage data;
a renewable energy bank in data communication with said charging station;
the renewable energy bank applying a renewable energy credit to a ledger of renewable energy balances based on a signal indicative of the renewable energy credit;
a renewable goods or services discount received by said mobile electric device based on a renewable energy balance associated with said mobile electric device.

16. The system of claim 15, wherein the renewable goods or services discount may be used to purchase at least one of electric vehicles, charging, solar panels, electric vehicle insurance, carbon credits and offsets, or shares in carbon credit funds.

17. The system of claim 15, wherein the mobile electric device includes an electric vehicle and the usage data includes information about the number of miles driven by the electric vehicle, the energy used by the electric vehicle, location information about where the electric vehicle was driven and when, and driving practices.

18. The system of claim 17, further comprising:
the mobile electric device receiving a prompt for usage data;
the mobile electric device selectively limiting the usage data provided to the system based on user preference.

19. The system of claim 15, wherein the discount received by said mobile electric device may be applied to a fee for the charge.

\* \* \* \* \*